United States Patent [19]

Henderson

[11] Patent Number: 4,996,899
[45] Date of Patent: Mar. 5, 1991

[54] METHOD AND APPARATUS FOR OPENING HAY BALES

[76] Inventor: Laurel D. Henderson, R.R. 2, Eagle Bend, Mich. 56446

[21] Appl. No.: 294,190

[22] Filed: Jan. 9, 1989

[51] Int. Cl.$^5$ ............................................. B26D 7/06
[52] U.S. Cl. ......................................... 83/23; 83/928; 83/929; 30/379; 29/564.3
[58] Field of Search ................... 83/39, 928, 613, 636, 83/795, 746, 753; 144/193 A, 193 D, 193 E, 193 R; 29/564.3; 30/379

[56] References Cited

U.S. PATENT DOCUMENTS

| | | | |
|---|---|---|---|
| 4,336,732 | 6/1982 | Liet et al. | 83/928 |
| 4,476,761 | 10/1984 | Bird | 83/928 |
| 4,771,670 | 9/1988 | Woerman | 83/928 |

Primary Examiner—Douglas D. Watts
Assistant Examiner—Hwei-Siu Payer
Attorney, Agent, or Firm—Henry C. Kovar

[57] ABSTRACT

A hay bale cutter and a method of cutting a hay bale open, particularly suited for large round bales. The cutter has an elongate generally horizontal blade with a sharpened cutting leading edge, a skid on a lower edge for keeping the blade above ground, an upward facing support surface for support of a cut bale on the blade, and structure for securing the trailing end of the blade to a motor vehicle. The method has the steps of mounting the blade on a vehicle, taking the vehicle and mounted blade to a hay bale, spearing the sharpened end of the blade into one end of the bale, and plunging the blade through the length of the bale to cut the bale open along a radius of the bale.

22 Claims, 2 Drawing Sheets

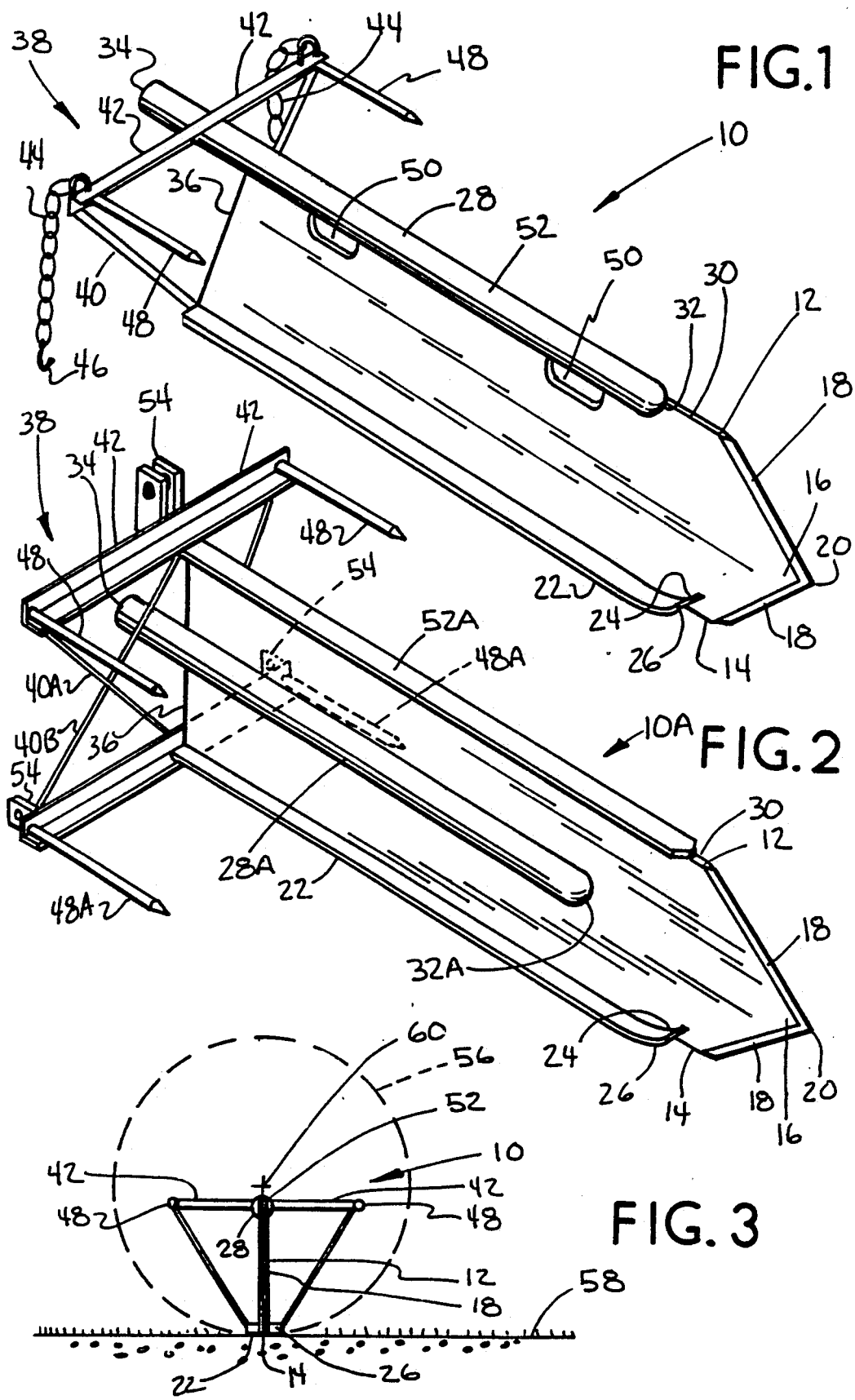

METHOD AND APPARATUS FOR OPENING HAY BALES

BACKGROUND OF THE INVENTION

1. Field of the Invention

This invention pertains to a method and an apparatus for opening hay bales, in particular large round hay bales.

2. The Prior Art

Round hay bales have been in common use for about two decades. The machinery to make these round bales is well known, available from several sources, and in common use.

Equipment to move the round bales is also available, a single spike on the front end loader of a tractor is commonly used. Special, dedicated, and relatively expensive lifting trailers are also available and used. It is easy to pick up and move these round bales.

Animals are not particularly well adapted to eat the hay directly from these bales; horses will usually refuse to eat the outer hay and must be given access to the inner hay. Cattle have trouble tearing hay from the bale.

There are two commonly used pieces of equipment and method for opening round hay bales to give the animals access to the hay. The first is a chainsaw which is a dirty and high risk job. The bale is cut along its length with the chainsaw and then pried open. One big advantage of the chainsaw technique is that it can be done anywhere.

The second piece of equipment is a bale grinder. This is a large and expensive piece of powered equipment that is fixed in location. The bale is brought to the grinder, lifted up and loaded whole into the grinder. The grinder tears up the bale and throws the hay out into the immediate area for consumption by the animals. The animals must also be brought to the grinder, or the ground hay must be carried to the animals.

OBJECTS OF THE INVENTION

It is an object of this invention to provide a new method and/or apparatus for opening hay bales.

It is a further object of this invention to provide a relatively safe, clean, portable, and low-cost method and/or apparatus for opening hay bales.

It is a further object to provide a combination hay bale carrier and opener.

SUMMARY OF THE INVENTION

A hay bale cutting device has an elongate blade having a cutting edge on one end, structure for keeping the blade above ground, and a hitch for mounting the blade to a vehicle.

A machine for cutting and opening round hay bales has a ground vehicle with a lift mechanism, an elongate knife blade having a cutting edge on a leading end, and a hitch mounting a trailing end of the blade to the lift mechanism.

A method of cutting and opening a round hay bale has the steps of mounting an elongate knife blade on a motor vehicle in a generally horizontal position with an outer edge of the blade having a sharpened edge, taking the vehicle and the mounted blade to a round hay bale, spearing the sharpened end of the blade into an end of the hay bale, plunging the blade sharpened end first through the entire length of the bale to cut the bale open along a radius line, withdrawing the blade out the end of the bale, and opening the bale diametrically about the radial cut line made by the knife.

Many other advantages, features and additional objects of the present invention will become manifest to those versed in the art upon making reference to the detailed description and accompanying drawings in which the preferred embodiment incorporating the principles of the present invention is set forth and shown by way of illustrative example.

BRIEF DESCRIPTION OF THE DRAWINGS

FIG. 1 is a perspective view looking down from the front end, at the preferred embodiment of a hay bale cutter according to the present invention;

FIG. 2 is a perspective view looking downward from the front end, at an alternative hay bale cutter according to the present invention;

FIG. 3 is an elevational view from the front or leading end of the embodiment of FIG. 1;

DESCRIPTION OF THE PREFERRED EMBODIMENT

Figure 4:
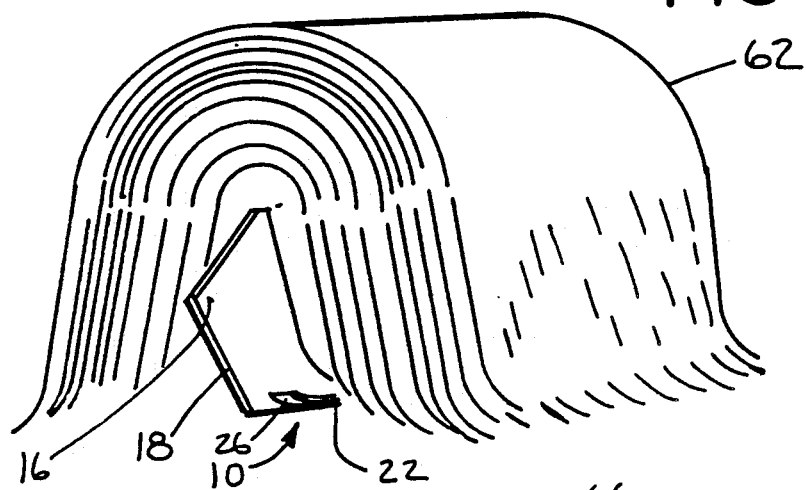
FIG. 4 is a perspective view of a round hay bale cut open and resting upon the cutter of either FIG. 1 or FIG. 2.

According to the principles of the invention, a hay bale cutter device is provided as is shown in FIG. 1 and generally indicated by the numeral 10.

The cutter 10 has an elongate blade 12 which is preferrably flat, disposed and used in a generally horizontal position, and which preferrably stands upright on its bottom edge 14. The blade 12 has a distal nose or leading end 16 which has a full height sharpened cutting edge 18 which preferrably has a point 20 at the midpoint of the height of the blade 12. The rake angles of the cutting edge 18 to the rear of the point 20 are preferrably equal. On the bottom edge 14 of the blade 12 is support skid 22 for sliding on the ground and for keeping the blade 12 above and out of the ground. On the front or leading end of the skid 22 is an upturned skid ramp 24 having a blunt upward facing ramp surface 26 to keep the skid 22 above and out of the ground. An elongate tube 28 is provided along the length of blade 12. The tube 28 is preferrably mounted on the top edge 30 of the blade 12, and has a closed and rounded nose 32 and an open mouth 34 at a trailing end 36 of the blade 12. The entire length of the tube 28 is preferrably straight and hollow, from the mouth 34 to the nose 32. On the trailing end 36 of the blade 12 is a hitch structure generally indicated by the numeral 38 which, regardless of what it is or looks like, is the structure for mounting and securement of the cutter 10 to a vehicle. The preferred hitch structure 38 includes a triangulated frame 40 with a pair of transverse arms 42, hitch chains 44 and hooks 46. Extending forward from the outer end of each arm 42 is a stabilizer spike 48. The cutter 10 has a pair of carrying and/or manipulating handles 50 formed by slots in the blade 12 immediately under and against the tube 28, the tube 28 is then manually grasped or hooked with machine lift elements (not shown) through the handles 50 and about the tube 28. The top of the tube 28 forms an upward facing elongate blunt surface 52 for support and carrying of a hay bale on the cutter 10.

FIG. 2 shows an alternative embodiment 10A with the tube 28a being on the centerline of the blade 12. The hitch structure 38A has a pair of triangulated frames 40A, 40B which forms an "X" on each side of the blade 12, either hitch structure 38, 38A may have a three-point hitch connector 54. Four stabilizer spikes 48, 48A may also be used. An alternative elongate bale support surface 52A is provided on top of the alternative cutter 10A.

FIG. 3 illustrates the profile of the cutter 10 behind a dotted line circle representing the diameter 56 of a hay bale. The blade 12 is generally perpendicular to the ground 58 and has a height which approximates a radius of the hay bale diameter 56. The blade 12 is lined up directly below the centerpoint and axis 60 of the hay bale. The transverse spacing of each stabilizer spike 48 from the blade 12 is preferably less than the height of the blade 12, so that the spikes 48 are positioned within the hay bale diameter 56, but closer to the diameter 56 than to the axis 60.

FIG. 4 illustrates a hay bale 62 which has been cut open by, and which is being supported on, the cutter 10.

Figure 5:
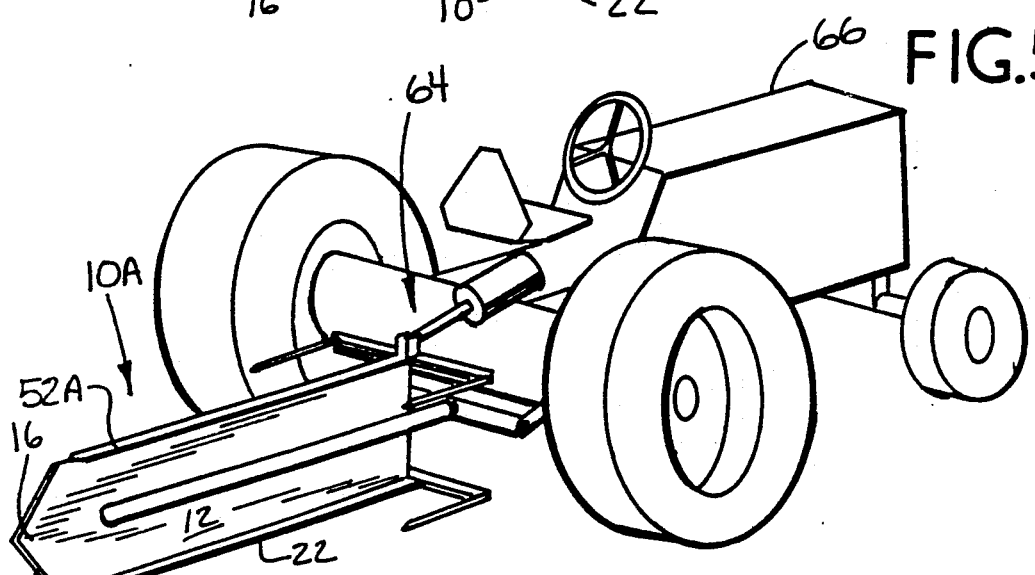
FIG. 5 is a perspective view of the cutter of FIG. 2 on a three-point hitch of the rear of a tractor.

FIG. 5 illustrates the cutter 10A mounted upon a three-point hitch 64 on the back end of a vehicle 66 such as a tractor. The mounting and up-down operation of the cutter 10 on the three-point hitch 64 will be conventional and is well understood.

Figure 6:
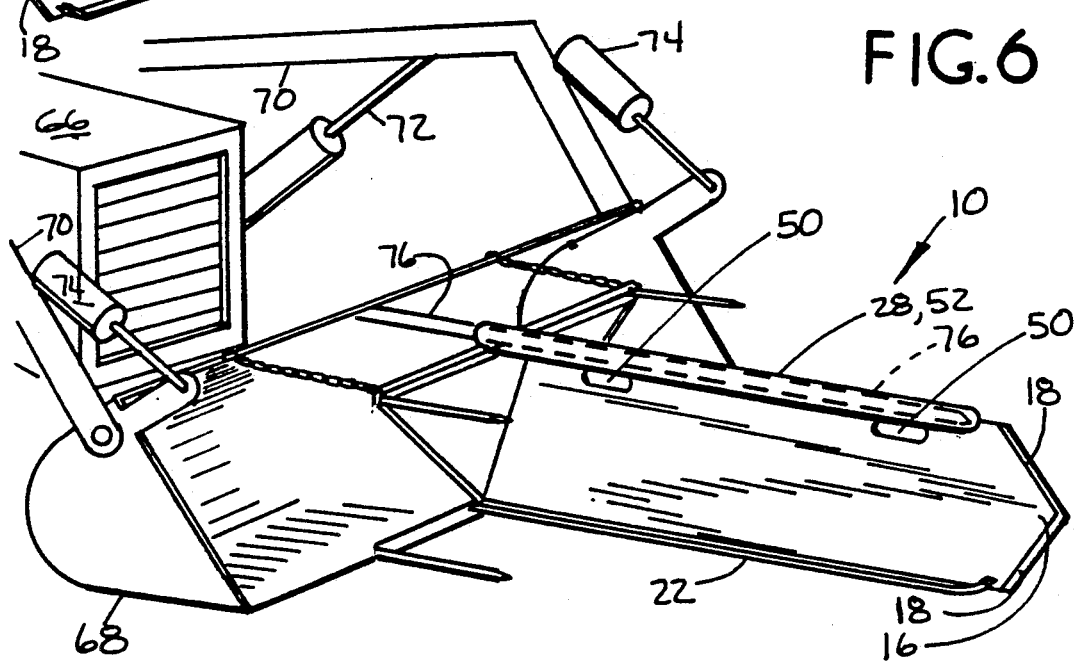
FIG. 6 is a perspective view of the cutter of FIG. 1 on the front end loader of a tractor.

FIG. 6 illustrates the cutter 10 mounted on a front bucket 68 of the vehicle 66. The bucket 68 or cutter 10 are raised up and down by the lift frame 70 and primary cylinders 72, and the bucket 68 and cutter 10 are rotated by secondary cylinders 74. The bucket 68 as shown has a conventional hay bale carrying bucket spike 76 which is fixed to the bucket. Virtually all farmers who bale the round bales 62 have these bucket spikes and/or a three-point spike (not shown) to lift and move their round bales. While the preferred vehicle 66 is shown as a tractor, it can also be a 4-wheel drive or a pick-up truck and the cutter 10 can be mounted on a conventional lift mechanism such as is commonly used for snow-plow blades. The cutter 10 can also be mounted to a tracked vehicle and even to a trailer to be pulled by a discrete motorized vehicle.

In the use of the cutter 10 and in the practice of the method of the present invention, the cutter 10 is firstly mounted and secured to the vehicle 66 by three-point hitch 64, to a bucket 68, or by whatever means is most appropriate. The bucket 68 could be removed from the frame 70 and the cutter 10 could have the complete structure to be mounted to the lift frame 70 in place of a bucket. Regardless, the cutter 10 is appropriately mounted to a vehicle and preferrably provided with up and down movement capability. Advantage is taken of the fact that most farmers have existing blade spikes 76 and the cutter tube 28 is sized to slip-fit on and over the existing spike 76 so that the existing spike 76 can be used as the primary mount for the cutter 10. The cutter 10 can also be mounted by a three point hitch connector 54 and a three-point hitch 64 such as are shown in FIGS. 2 & 5.

The vehicle 66 and bucket 68 are then driven to the hay bale 62 wherever it is. The cutter 10 is lined up against one end of the bale as is best shown in FIG. 3 with the blade 12 being square to the end of the bale and being aligned with the bale axis 60. The cutter 10 is lowered until the bottom edge is about touching on the ground and the blade 12 is positioned so that it is parallel to the ground and the bale axis 60. The sharpened end 18 of the blade 12 is then speared into the end of the hay bale 62 and the blade 12 is then plunged through the entire length of the bale 62 until the blade 12 comes out the far end of the bale 62 as is seen in FIG. 4. The entire bale 62 is then cut along its entire length in a radial line as is clearly shown. The bale 62 expands away from the blade 12 as it is being cut open, and upon completion of the blade plunge and cut, the bale 62 diametrically explodes open. The stabilizing spikes 48 are stuck in the bale and the weight of the bale is on the support surface 52, 52A and the stabilizer spikes 48. The cut and opened bale 62 can be carried by the cutter to a place of consumption and it need not be left where it was opened for consumption. The vehicle 66 can be moved around to swing the cutter 10 sideways and up and down to shake the bale 62 further open and break it up. The vehicle 66 is backed up and the cutter 10 withdrawn from the opened bale 62 and the hay is easily accessible for consumption. The stabilizer spikes 48 are withdrawn before the blade 12 and the unstabilize bale can be further shaken with the blade 12 to bust it up.

The vehicle 66 and cutter 10 can then be driven to a storage site and the cutter 10 quickly removed from the vehicle 66 which is then immediately available for other purposes.

This cutter 10 and method of cutting open a hay bale are extremely effective and useful. The cost of the cutter 10 is relatively modest. It is mobile, it mounts to and comes off of the vehicle very fast and easily, it does not cause dust, it works with wet or dry or new or old hay bales, the person using the cutter 10 and the method is nowhere near the hay bale 62 when it explodes open, there are no moving parts to catch clothing, and the risk of injury and accident are significantly reduced. The cutter 10 can be left out in the weather and needs no maintenance. The cutter 10 has no moving or loose parts to be lost. This cutter 10 and method are usable by farmers and animals feeding endeavors of all sizes, be they large, small, or hobby.

Although other advantages may be found and realized and various modifications may be suggested by those versed in the art, it should be understood that 1 wish to embody within the scope of the patent warranted hereon, all such embodiments as reasonably and properly come within the scope of my contribution to the art.

I claim as my invention:

1. A haybale cutting device, comprising
   (a) an elongate knife blade having a cutting edge on a leading end;
   (b) blunt ground contact and blade support means on and fixed to a bottom of the blade for keeping the blade and the cutting edge above ground, said cutting edge extending downward to a level of said contact means; and
   (c) hitch means on a trailing end of the knife blade for mounting the blade to a motorized vehicle with said hitch means and said blade being positionally fixed with respect to each other.

2. The haybale cutting device of claim 1, including bale carrying means along the length of the blade for carrying the cut haybale.

3. The haybale cutting device of claim 2, in which said ground contact means has a ramp having a blunt upward facing surface.

4. The haybale cutting device of claim 3, in which said ramp is elongate and on a bottom generally horizontal edge of the blade.

5. The haybale cutting device of claim 2, including stabilizing means for radially indexing the diametric section of the round haybale on the knife blade.

6. The haybale cutting device of claim 5, in which said stabilizing means includes a spike positioned generally parallel to, along side, and spaced from said knife blade, said spike being closer to said blade than the height of said blade.

7. The haybale cutting device of claim 6 including a second said spike, there being one of said spike on each side of the knife blade.

8. The haybale cutting device of claim 7, in which said spikes are at the level of a top of the knife blade.

9. The haybale cutting device of claim 7, including a triangulated said hitch means, said two spikes being mounted on corners of said hitch means.

10. The haybale cutting device of claim 1, including at least one handle hole along a top of the knife blade.

11. The haybale cutting device of claim 1, including a haybale carrying spike and means in said knife blade for slipping said blade on and off of the carrying spike.

12. A machine for cutting and opening round haybales, comprising
  (a) a ground vehicle having motive means for moving on the ground, and a lift mechanism movably mounted on the vehicle;
  (b) an elongate knife blade having a cutting edge on a leading end and a ground contact support skid on a bottom edge; and
  (c) connecting means on a trailing end of said blade for mounting and securing said blade to said mechanism, for enabling said vehicle to carry said blade to a round haybale and for enabling said lift mechanism to place said skid on the ground and said cutting edge of said blade directly against a radius line in an end of the haybale, and for enabling the vehicle to spear the cutting edge into the radius line and to plunge the blade along the ground and through the bale cutting edge first, to cut and open the bale from the ground up along its radius.

13. The machine of claim 12, including means on a bottom of the blade for keeping the blade above ground.

14. The machine of claim 12, in which said lift has a haybale carrying spike thereon, said blade having tubular means for sliding of the blade on and off of the bale carrying spike.

15. The machine of claim 12, in which said hitch connecting means has a pair of transverse arms extending outward from each side of the blade, said arms having a pair of upper points spaced one to each side of a top edge of the blade, said upper points being connectible to said vehicle.

16. The machine of claim 15, including a stabilizer spike extending forward alongside and spaced from the blade, there being one such spike on each upper point.

17. A method of cutting and opening a round haybale, comprising the steps of
  (a) mounting an elongate knife blade on a motor vehicle with an elongate length of the blade being positioned generally horizontal and an outer end edge of the blade having been sharpened to a cutting edge;
  (b) taking the vehicle and the mounted blade to a round haybale;
  (c) lowering the blade until a blunt support skid on a blade bottom edge is on the ground;
  (d) spearing the sharpened end of the blade into one end of the haybale while the skid is on the ground;
  (e) plunging the blade sharpened end first through the entire length of the bale with the skid being on the ground and the blade being in a plane of a radius of the bale, to cut the bale open from the ground up along said bale radius;
  (f) withdrawing the blade out of the bale through said one end of the bale; and
  (g) opening up the bale diametrically about the radial cut line made by the knife blade.

18. The method of claim 17, including the flutter steps of carrying the cut bale on the blade, and stabilizing the bale on the blade by driving at least one stabilizer spike into the bale alongside and spaced from the knife blade.

19. The method of claim 18, including the step of withdrawing the stabilizer spike before complete withdrawal of the knife blade.

20. The method of claim 17, in which said step of opening up includes shaking the cut bale with the knife blade to force the bale open, before completely withdrawing the blade.

21. The method of claim 17, in which said step of mounting includes mounting of the blade on an existing blade carrying spike.

22. The method of claim 21, including the further step of sliding the blade onto the length of the bale carrying spike.

* * * * *